(12) United States Patent
Geis et al.

(10) Patent No.: US 9,094,497 B1
(45) Date of Patent: Jul. 28, 2015

(54) DTMF CIRCUIT AND METHOD OF RELAYING DTMF DIGITS IN A DTMF CIRCUIT

(71) Applicant: Sprint Communications Company L.P., Overland Park, KS (US)

(72) Inventors: Robert E. Geis, Lenexa, KS (US); Siddharth Oroskar, Overland Park, KS (US); Pierce Andrew Gorman, Lee's Summit, MO (US); Gerald Baylis Prince Young, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 13/947,461

(22) Filed: Jul. 22, 2013

(51) Int. Cl.
*H04M 7/12* (2006.01)
*H04Q 1/45* (2006.01)

(52) U.S. Cl.
CPC ............... *H04M 7/1295* (2013.01); *H04Q 1/45* (2013.01)

(58) Field of Classification Search
None
See application file for complete search history.

(56) References Cited

U.S. PATENT DOCUMENTS

| 6,411,679 | B1 * | 6/2002 | Khasnabish ...................... 379/9 |
| 7,486,665 | B2 | 2/2009 | Mekala et al. |
| 7,701,971 | B2 | 4/2010 | Agarwal et al. |
| 7,729,267 | B2 | 6/2010 | Oran et al. |
| 2008/0137650 | A1 | 6/2008 | Kumarasamy et al. |
| 2011/0142205 | A1 * | 6/2011 | Bonnett ..................... 379/26.01 |

\* cited by examiner

*Primary Examiner* — Fan Tsang
*Assistant Examiner* — Jeffrey Lytle (57) ABSTRACT

A Dual Tone Multi Frequency (DTMF) circuit for relaying DTMF digits includes a communication interface, a storage system configured to store a sampling window size, a DTMF test sequence, a returned DTMF sequence, and one or more DTMF digits, with the one or more DTMF digits to be transferred to a second DTMF circuit by the DTMF circuit, and a processing system. The processing system receives the one or more DTMF digits via the communication interface and an input sampling window, generates the DTMF test sequence and transmits the DTMF test sequence to the second DTMF circuit, compares the DTMF test sequence to a returned DTMF sequence received back from the second DTMF circuit, and if the returned DTMF sequence is not the same as the DTMF test sequence, adjusts the sampling window size of the input sampling window.

17 Claims, 5 Drawing Sheets

DTMF CIRCUIT AND METHOD OF RELAYING DTMF DIGITS IN A DTMF CIRCUIT

TECHNICAL FIELD

Aspects of the disclosure are related to the field of communications, and in particular, to relaying DTMF digits.

TECHNICAL BACKGROUND

Dual Tone Multi Frequency (DTMF) tones comprise tones developed for the Public Switched Telephone Network (PSTN), wherein each telephone key produces a unique DTMF tone when pressed. A DTMF tone comprises two tones of specific frequencies. The DTMF system uses eight different frequency signals that are transmitted in pairs to represent 16 different numbers, symbols, and letters.

The DTMF system was originally developed to be included in-band with the telephone voice signal. However, in current systems the DTMF tones may be included in-band, along with a voice call or audio, or may be transmitted out-of-band.

A DTMF circuit may receive an audio signal including DTMF tones or digits. The DTMF circuit may need to relay the DTMF digits, such as to other communication devices or components. In some circumstances, when the DTMF device transfers a DTMF digit to a receiving DTMF device, the DTMF device may incorrectly receive more than one DTMF digit. This may be more likely if the received DTMF digit has been previously transcoded or otherwise processed. The incorrect reception of a DTMF digit or digits may lead to incorrect operation of the device or devices receiving the DTMF digits.

OVERVIEW

Systems and methods for relaying DTMF digits are provided herein. In one example, a Dual Tone Multi Frequency (DTMF) circuit for relaying DTMF digits includes a communication interface adapted to exchange one or more DTMF digits over a communication link, a storage system configured to store a sampling window size, a DTMF test sequence, a returned DTMF sequence, and the one or more DTMF digits, with the one or more DTMF digits to be transferred to a second DTMF circuit by the DTMF circuit, and a processing system coupled to the communication interface and the storage system, with the processing system configured to receive the one or more DTMF digits via the communication interface and an input sampling window, generate the DTMF test sequence and transmit the DTMF test sequence to the second DTMF circuit, compare the DTMF test sequence to a returned DTMF sequence received back from the second DTMF circuit, and if the returned DTMF sequence is not the same as the DTMF test sequence, then adjust the sampling window size of the input sampling window.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
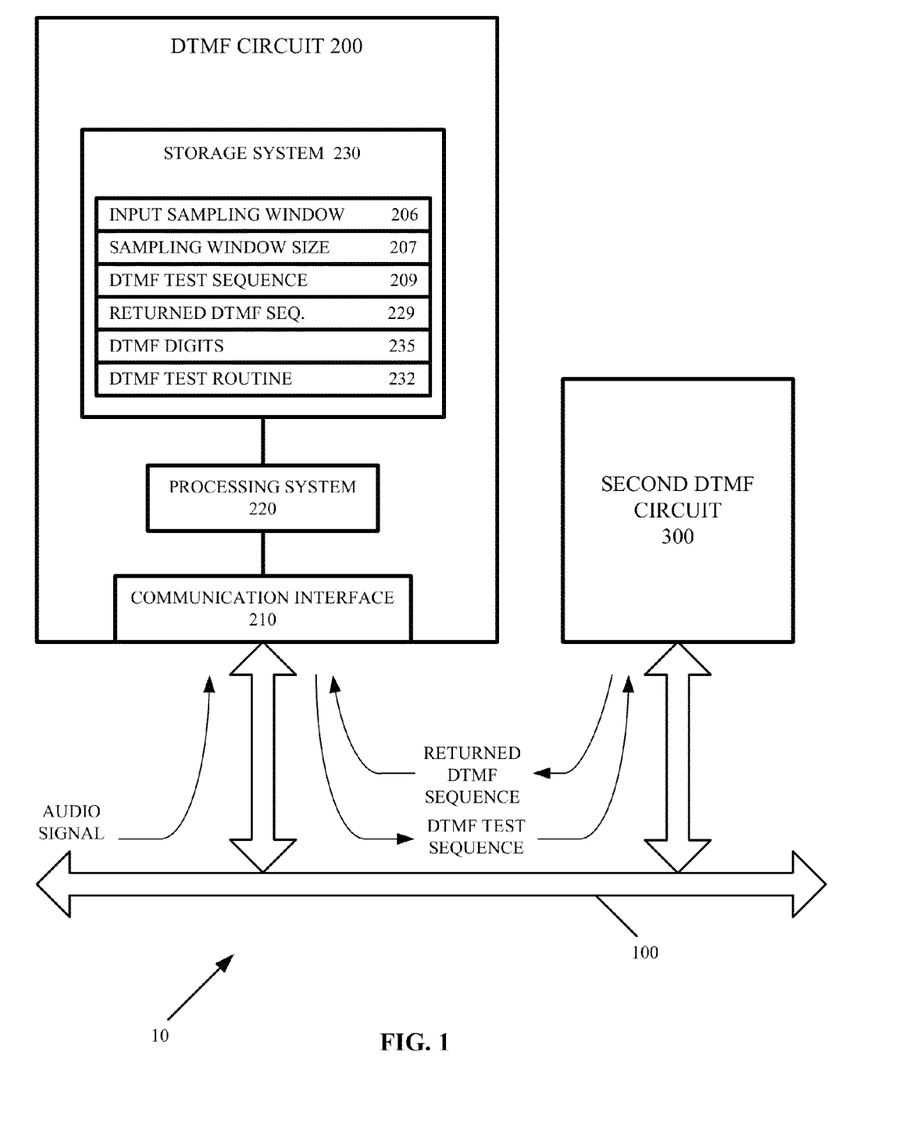
FIG. 1 shows an example DTMF circuit.

FIG. 1 shows an example DTMF circuit 200. The DTMF circuit 200 resides in a communication system 10. The communication system 10 includes a communication link 100, the DTMF circuit 200, and a second DTMF circuit 300. It should be understood that other or additional components may be included in the communication system 10, but are not shown for clarity.

The DTMF circuit 200 receives an audio signal including one or more Dual Tone Multi Frequency (DTMF) digits. The one or more DTMF digits may comprise signaling DTMF digits, for example. The one or more DTMF digits may comprise in-band or out-of-band DTMF digits. The DTMF circuit 200 relays the one or more DTMF digits to the second DTMF circuit 300.

The DTMF circuit 200 exchanges communications over the communication link 100. The DTMF circuit 200 receives an incoming audio signal, identifies DTMF digits in the incoming audio signal, and relays the DTMF digits to the second DTMF circuit 300. Optionally, the DTMF circuit 200 converts incoming DTMF tones into other formats, such as converting received audio DTMF tones into digital values, codes, symbols, tokens, or other representations of the DTMF tones.

The DTMF tone information received at the second DTMF circuit 300 should not be different from the DTMF digits received by the DTMF circuit 200. However, it is possible for an incorrect DTMF digit to be received in the second DTMF circuit 300, such as where the second DTMF circuit 300 incorrectly receives a single DTMF digit as multiple DTMF digits. This may happen where transcoding or other processing has been performed on the DTMF information.

In order to avoid the second DTMF circuit 300 receiving incorrect DTMF digits, the DTMF circuit 200 performs a test of DTMF tone transmission before relaying DTMF tone information to the second DTMF circuit 300. The DTMF circuit 200 generates a DTMF test sequence 209 and transmits the DTMF test sequence 209 to the second DTMF circuit 300. The DTMF circuit 200 subsequently receives a returned DTMF sequence 229 that is returned from the second DTMF circuit 300. The DTMF circuit 200 compares the returned DTMF sequence 229 to the DTMF test sequence 209 and uses the result of the comparison when subsequently transmitting the actual DTMF tone information to the second DTMF circuit 300.

The DTMF circuit 200 includes a processing system 220, a communication interface 210, and a storage system 230. The processing system 220 is coupled to the communication interface 210 and the storage system 230.

The communication interface 210 is coupled to the communication link 100 and is configured to exchange DTMF digits over the communication link 100. The communication interface 210 may receive one or more DTMF digits over the communication link 100. The one or more DTMF digits may comprise audio DTMF tones. Alternatively, the one or more DTMF digits may comprise the DTMF digits in another format, such as packetized audio.

The storage system 230 stores data including operational data used during processing. The storage system 230 in an example stores a DTMF test routine 232, an input sampling window 206, a sampling window size 207 of the input sampling window 206, a DTMF test sequence 209, a returned DTMF sequence 229, and one or more DTMF digits 235.

The DTMF circuit 200 includes an input sampling window 206 for receiving an incoming signal and extract information from the incoming signal. For example, where the incoming signal includes a DTMF "7" tone, the input sampling window 206 may be lengthened or shortened in order to capture various amounts of incoming audio. The input sampling window 206 may be lengthened or shortened to ensure that a received DTMF digit is transferred to the second DTMF circuit 300 as a single digit, and not as multiple occurrences of the DTMF digit. Alternatively, or in addition, the input sampling window 206 may be lengthened or shortened to ensure that a received DTMF digit is transferred to the second DTMF circuit 300.

The DTMF circuit 200 may operate using a default input sampling window size. However, a default input sampling window may not be optimal in all DTMF tone relaying situations. For example, where the input sampling window is large, the DTMF circuit 200 may transmit a large amount of audio (or pre-audio) to the second DTMF circuit 300. Unfortunately, the second DTMF circuit 300 may interpret the relayed data as comprising two occurrences of a DTMF tone where only one DTMF tone was actually received in the DTMF circuit 200, such as where the relayed data has been subjected to a transcoding operation, for example. The incorrect reception of a DTMF digit or digits may lead to incorrect information being transferred or may lead to incorrect operation of a device or devices receiving the DTMF digits.

The input sampling window 206 comprises a time window or a frequency window for capturing a predetermined amount of input. The size of the input sampling window 206 may depend on the expected input signal, such as an audio signal that may include DTMF digits or tones of predetermined duration. One communication protocol that may dictate the size of the input sampling window 206 comprises the RFC 2833 protocol, which enables in-band and out-of-band transmission of DTMF digits.

The sampling window size 207 comprises a size of the input sampling window 206. The input sampling window size 207 controls the size of an input sampling window for receiving communications over the communication link 10, for example. The sampling window size 207 may be adjusted to receive more or less DTMF input information in some embodiments.

The DTMF test sequence 209 comprises a DTMF test sequence that is suitable for testing the transmission of DTMF tone information from the DTMF circuit 200 to the second DTMF circuit 300. The DTMF test sequence 209 may comprise a pulse or a series of pulses in some embodiments. The pulse or series of pulses may have predetermined pulse widths and/or duty cycles.

The returned DTMF sequence 229 comprises a version of the DTMF test sequence 209 that has been transferred to and returned from the second DTMF circuit 300. As a result, the returned DTMF sequence may differ from the DTMF test sequence 209.

It is a problem that the second DTMF circuit 300 may interpret a received single DTMF tone as comprising two or more DTMF digits (i.e., the DTMF digit plus a duplicate of the DTMF digit). Such DTMF digit transmission is erroneous and may result in erroneous operation on the part of the second DTMF circuit 300 (or other downstream device or process).

The DTMF digits 235 comprise one or more DTMF digits received in the DTMF circuit 200 over the communication link. The DTMF digits 235 may be received in various forms or according to various communication protocols. The DTMF digits 235 are digits to be transferred to the second DTMF circuit 300 by the DTMF circuit 200.

In general, when the DTMF test routine 232 is loaded into the processing system 220 and executed, the processing system 220 is transformed into a special-purpose computing system configured to exchange communications with the second DTMF circuit 300 over the communication link 100, among other operations.

The DTMF test routine 232 comprises operating instructions that configure the processing system 220, when executed by the DTMF circuit 200 in general or the processing system 220 in particular, to direct the DTMF circuit 200 or the processing system 220 to receive one or more DTMF digits 235 via an input sampling window 206, with the one or more DTMF digits 235 to be transferred to a second DTMF circuit 300 by the DTMF circuit 200, generate a DTMF test sequence 209 and transmit the DTMF test sequence 209 to the second DTMF circuit 300, compare the DTMF test sequence 209 to a returned DTMF sequence 229 received back from the second DTMF circuit 300, and if the returned DTMF sequence 229 is not the same as the DTMF test sequence 209, then adjust a sampling window size 207 of the input sampling window 206.

Figure 2:
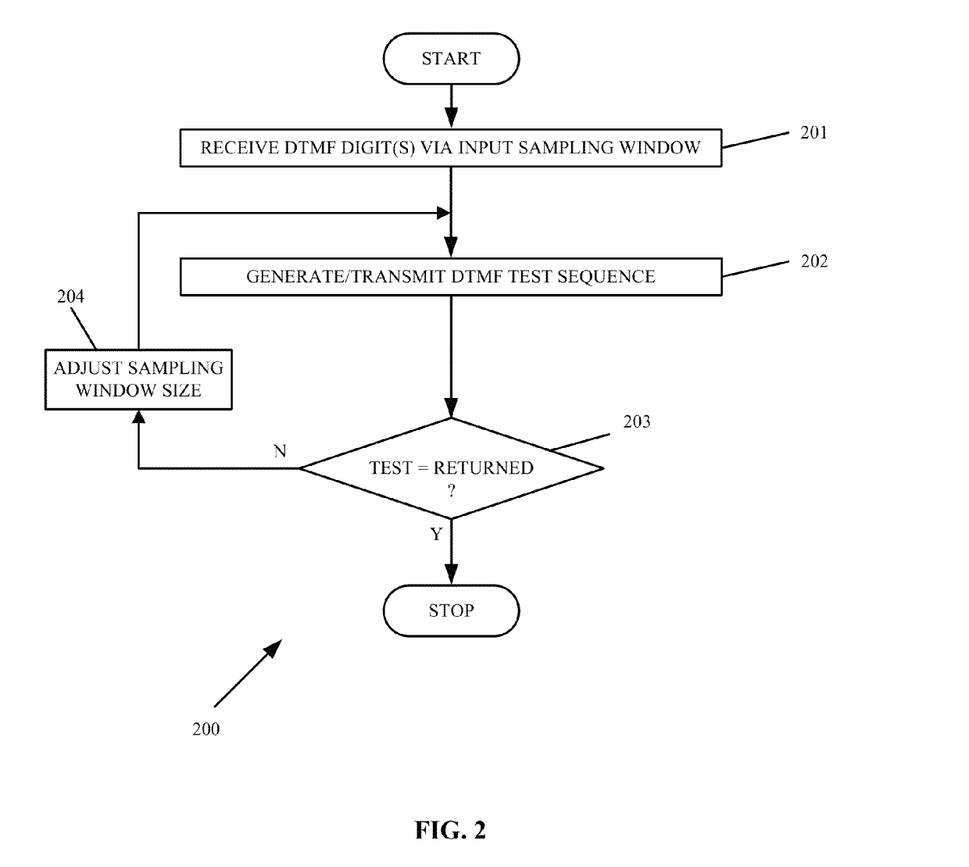
FIG. 2 is a flowchart of a method of relaying DTMF digits in a DTMF circuit.

FIG. 2 is a flowchart 200 of a method of relaying DTMF digits in a DTMF circuit. In step 201, one or more DTMF digits are received via the input sampling window. The input sampling window may be at a default size, for example, or may be of a size previously set for receipt of DTMF digits or for receipt of non-DTMF inputs. The size of the input sampling window will affect how the one or more DTMF digits are received and interpreted. The received one or more DTMF digits are to be transferred to a second DTMF circuit by the receiving DTMF circuit.

In step 202, a DTMF test sequence is generated and transmitted to the second DTMF circuit. The DTMF test sequence can comprise any DTMF test sequence that is suitable for testing the transmission of DTMF tone information from the DTMF circuit to the second DTMF circuit. The DTMF test sequence may comprise a pulse or a series of pulses in some embodiments. The pulse or series of pulses may have predetermined pulse widths and/or duty cycles.

In step 203, the DTMF circuit receives a returned DTMF sequence from the second DTMF circuit and compares the DTMF test sequence to the returned DTMF sequence. The returned DTMF sequence comprises a version of the DTMF test sequence that has been transferred to and returned from the second DTMF circuit. As a result, the returned DTMF sequence may differ from the DTMF test sequence. As a result, the returned DTMF circuit may the same or different from the DTMF test sequence. If the returned DTMF sequence is the same as the DTMF test sequence, the method exits. Otherwise, where the returned DTMF sequence is not the same as the DTMF test sequence, then the method branches to step 204.

In step 204, where the returned DTMF sequence is not the same as the DTMF test sequence, then the sampling window size is adjusted. For example, the sampling window size may be lengthened or shorted by the DTMF circuit, depending on how the returned DTMF sequence compares to the DTMF test sequence. Consequently, in some embodiments the amount of a DTMF digit that is sampled by the input sampling window of the DTMF circuit may accept more or less of a DTMF digit information being received in the DTMF circuit.

Figure 3:
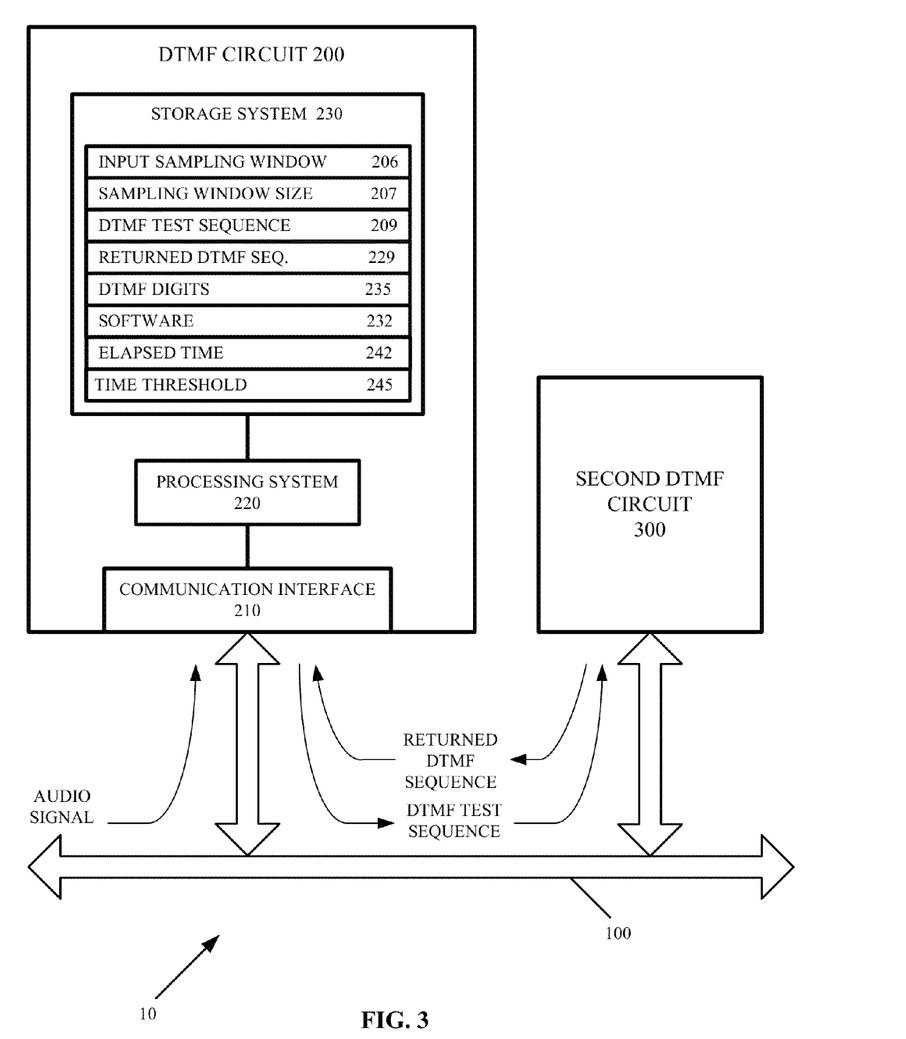
FIG. 3 shows another example DTMF circuit.

FIG. 3 shows another example DTMF circuit 200. The storage system 230 in this example additionally includes an elapsed time 242 and a predetermined time threshold 245. The elapsed time 242 and the predetermined time threshold 245 are used by the DTMF test routine 232 to determine how long to iteratively continue to adjust the sampling window size 207.

The elapsed time 242 comprises an elapsed time in determining a proper sampling window size 207. The elapsed time 242 in some examples comprises an elapsed time since the initiation of operation of the DTMF test routine 232.

The predetermined time threshold 245 is a predetermined time-out time period. The predetermined time threshold 245 is used by the DTMF test routine 232 to determine how long to iteratively attempt to adjust the sampling window size 207. The predetermined time threshold 245 comprises a time period beyond which the DTMF circuit 200 will not continue to try to adjust the sampling window size 207.

The DTMF test routine 232 comprises operating instructions that configure the processing system 220, when executed by the DTMF circuit 200 in general or the processing system 220 in particular, to direct the DTMF circuit 200 or the processing system 220 to receive one or more DTMF digits 235 via an input sampling window 206, with the one or more DTMF digits 235 to be transferred to a second DTMF circuit 300 by the DTMF circuit 200, generate a DTMF test sequence 209 and transmit the DTMF test sequence 209 to the second DTMF circuit 300, determine if an elapsed time 242 has exceeded a predetermined time threshold 245, if the elapsed time 242 has not exceeded the predetermined time threshold 245, then compare the DTMF test sequence 209 to a returned DTMF sequence 229 received back from the second DTMF circuit 300, and if the returned DTMF sequence 229 is not the same as the DTMF test sequence 209, then adjust a sampling window size 207 of the input sampling window 206 and iteratively repeating the generating, determining, and comparing steps.

Figure 4:
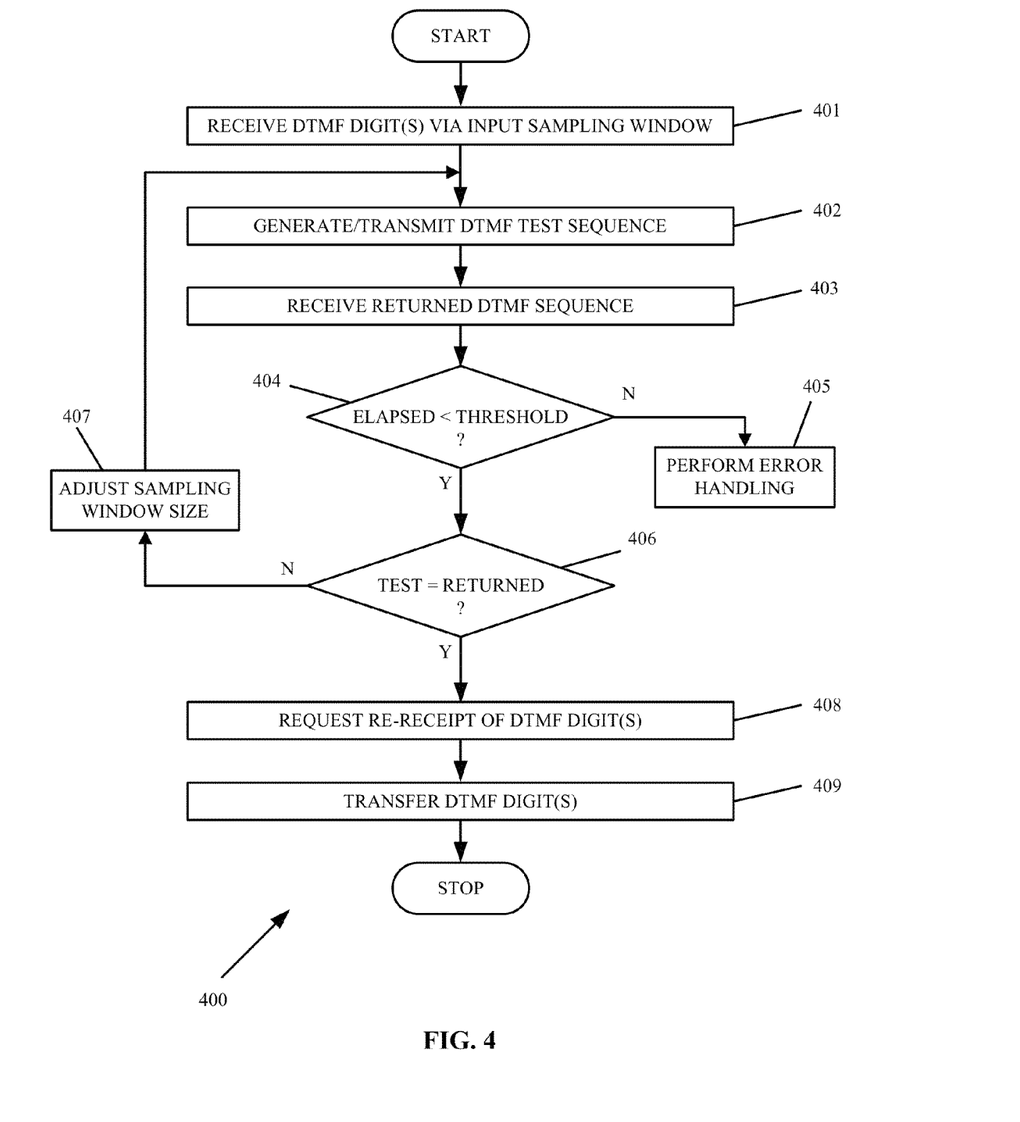
FIG. 4 is a flowchart of another method of relaying DTMF digits in a DTMF circuit.

FIG. 4 is a flowchart 400 of another method of relaying DTMF digits in a DTMF circuit. In step 401, one or more DTMF digits are received via the input sampling window, as previously discussed.

In step 402, a DTMF test sequence is generated and transmitted to the second DTMF circuit, as previously discussed.

In step 403, the DTMF circuit receives a returned DTMF sequence from the second DTMF circuit.

In step 404, an elapsed time is compared to a predetermined time threshold. The elapsed time comprises a time period in which the DTMF circuit tries to establish a proper sampling window size so that the returned DTMF sequence is the same as the DTMF test sequence. However, the attempt to establish a proper sampling window size cannot be allowed to loop infinitely and maybe limited to a time period as dictated by the predetermined time threshold. If the elapsed time is less than the predetermined time threshold, then the method proceeds to step 406. Otherwise, where the elapsed time is not less than the predetermined time threshold, then an error timeout occurs and the method branches to step 405.

In step 405, an error handling is performed. The error handling comprises error handling wherein the timeout occurred while trying to set the proper sampling window size. It should be understood that step 405 may be optional.

In some embodiments, the error handling comprises playing or transferring an error message, with the error message stating that the receiver (i.e., the second DTMF circuit, which may or may not be the destination device of the call) cannot process the dialed DTMF digits. In other embodiments, the error handling comprises routing the call through other resources. The other resources may transmit the DTMF digits and the other resources may then be terminated after the DTMF digits have been transferred, for example. The other resources may comprise routing the call to a Media Gateway (MGW). The other resources may comprise routing the call through Time-Division Multiplexing (TDM) resources if the call is a three-way call, for example.

In step 406, the DTMF test sequence is compared to the returned DTMF sequence, as previously discussed. If the returned DTMF sequence is the same as the DTMF test sequence, the method branches to step 408. Otherwise, where the returned DTMF sequence is not the same as the DTMF test sequence, then the method branches to step 407.

In step 407, where the returned DTMF sequence is not the same as the DTMF test sequence, then the sampling window size is adjusted, as previously discussed. The method then branches back to step 402.

In step 408, where the returned DTMF sequence is equal (or now equal) to the DTMF test sequence, the DTMF circuit requests re-receipt of the one or more DTMF digits. It should be understood that step 408 may be optional. The request of re-receipt maybe done to ensure that the one or more DTMF digits are properly received, and as a result the one or more DTMF digits may be re-received using the adjusted input sampling window. Alternatively, where the received one or more DTMF digits are temporarily stored, such as in a buffer, for example, the one or more DTMF digits may be re-processed, using the adjusted input sampling window. As a result, the one or more DTMF digits are not relayed to the second DTMF circuit as originally received in the DTMF circuit.

In step 409, after the sampling window size has been adjusted (if needed), the received one or more DTMF digits are transferred to the second DTMF circuit. As a result of a sampling window size adjustment, the second DTMF circuit should receive the one or more DTMF digits exactly as the DTMF circuit received the one or more DTMF digits.

Figure 5:
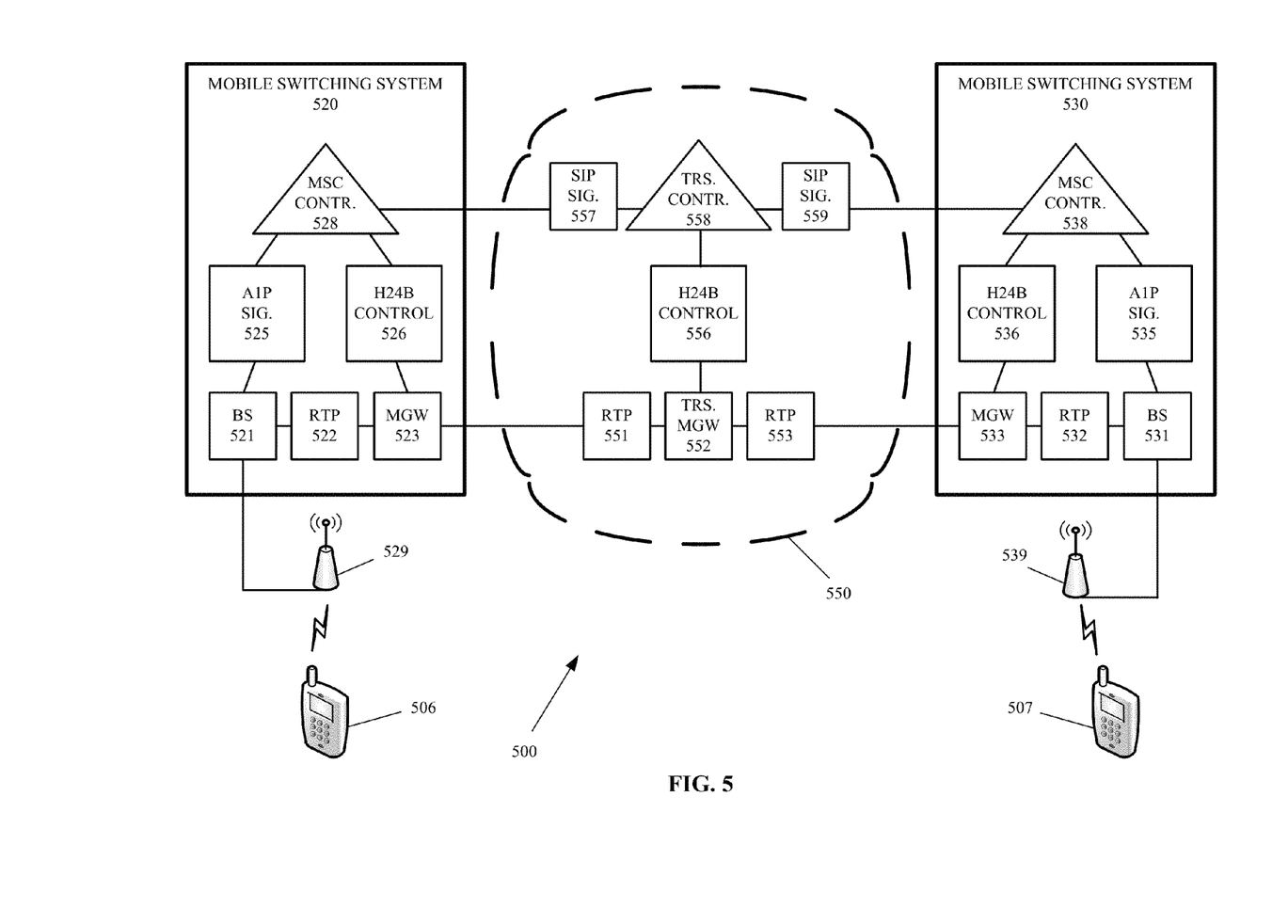
FIG. 5 shows an example communication network.

FIG. 5 shows an example communication network 500. The communication network 500 includes a mobile switching system 520, an intermediate network 550, and a second mobile switching system 530. The mobile switching system 520 and the second mobile switching system 530 are coupled to corresponding wireless transmission infrastructure 529 and 539. The mobile switching system 520 and the second mobile switching system 530 wirelessly exchange communications between wireless devices, such as the mobile communication devices 506 and 507. Any suitable communication protocol may be employed between the mobile switching system 520, the second mobile switching system 530, and the mobile communication devices 506 and 507. Any suitable communication protocol may be employed between the mobile switching system 520, the second mobile switching system 530, and the intermediate network 550.

The mobile switching system 520 and the second mobile switching system 530 in some embodiments include a data transport path comprising base stations (BSs) 521 and 531 (coupled to the corresponding transmission infrastructure 529 and 539), Real-time Transport Protocol (RTP) transmission media 522 and 532, and media gateways (MGWs) 523 and 533. Any suitable data transport protocol or communication protocol may be employed in the data transport path.

The mobile switching system 520 and the second mobile switching system 530 in some embodiments include a signaling path comprising A1P signaling components 525 and 535, H24B control components 526 and 536, and Mobile Switching Center controllers (MSC CONTR.) 528 and 538. Signaling can be exchanged between the mobile switching system 520 and/or the second mobile switching system 530 and the intermediate network 550 via the signaling path. Any suitable signaling protocol or communication protocol may be employed.

The intermediate network 550 in the example shown includes a data transport path comprising RTP media components 551 and 553 and a transit media gateway (TRS. MGW) 552. The transit media gateway 552 interfaces between the RTP media components 551 and 553, wherein packet data is transported by the data transport path.

The intermediate network 550 in the example shown includes a signaling path comprising Session Initiation Protocol (SIP) signaling components (SIP SIG.) 557 and 559 and a transit controller (TRS. CONTR.) 558. The transit controller 558 interfaces between the SIP signaling components 557 and 559, wherein signaling is relayed between the mobile switching system 520 and the second mobile switching system 530.

The intermediate network 550 may further include an H24B controller 556. The H24B controller 556 may be coupled to the transit media gateway 552 and to the transit controller 558, as shown in the figure. In operation, the H24B controller 556 may regulate the exchange of signaling in the signaling path and may regulate the data transport in the data transport path.

It is a drawback of the communication network 500 that the communication network 500 may change or affect user data being transported from a first user to a second user. The first user may comprise the mobile communication device 506 and the second user may comprise the mobile communication device 507. Alternatively, the first user may comprise the mobile switching system 520 and the second user may comprise the second mobile switching system 530. For example, the transit media gateway 552 may perform transcoding on the user data, including on DTMF digits sent by the first user to the second user via the communication network 500. For example, the first user may be sending DTMF digits to the second mobile switching system 530 in order to generate a telephone call to the second user at the mobile communication device 507. Alternatively, the first user may be sending DTMF digits to network components of the second mobile switching system 530 or to the intermediate network 550. The transcoding may affect the DTMF digits, wherein the intended DTMF digits are not properly received by the second user (or by other users or devices).

The DTMF circuits 200 and 300 can be dedicated devices or can be subcomponents or subsystems of other devices or systems. For example, the DTMF circuits 200 and 300 can be subcomponents or subsystems of wireless devices, fixed or mobile wireless devices, gateways, base stations, base transceiver stations, mobile switching centers, or other wireless transmission and/or processing devices. Alternatively, or in addition, the DTMF circuits 200 and 300 can be sub-components or subsystems of wired devices, fixed communication devices, gateways, transceivers, switches, routers, or other wired transmission and/or processing devices.

The communication interface 210 may communicate in a wired or wireless fashion over the communication link 100. The communication link 100 may comprise any suitable wired or wireless link. The communication interface 210 can use various protocols or communication formats.

The processing system 220 comprises one or more microprocessors and other circuitry that retrieves and executes the DTMF test routine 232 from the storage system 230. The processing system 220 can be implemented within a single processing device or can be distributed across multiple processing devices or sub-systems that cooperate in executing program instructions. Examples of the processing system 220 include general purpose central processing units, application specific processors, and logic devices, as well as any other type of processing device, combinations, or variations thereof.

The storage system 230 comprises a computer readable storage media readable by the processing system 220 and capable of storing the DTMF test routine 232. The storage system 230 can include volatile and nonvolatile, removable and non-removable media implemented in any method or technology for storage of information, such as computer readable instructions, data structures, program modules, or other data. The storage system 230 may be independent from or integrated into the processing system 220. Data is stored in and recalled from the storage system 230. In an example, the storage system 230 stores DTMF test routine 232, an input sampling window 206, a sampling window size 207 of the input sampling window 206, a DTMF test sequence 209, a returned DTMF sequence 229, and one or more DTMF digits 235. Other data may also be stored in the storage system 230.

In addition to storage media, in some examples, the storage system 230 can include communication media over which the DTMF test routine 232 can be communicated. The storage system 230 can be implemented as a single storage device but can also be implemented across multiple storage devices or sub-systems co-located or distributed relative to each other. The storage system 230 can comprise additional elements, such as a controller, capable of communicating with the processing system 220. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

The DTMF test routine 232 can include additional processes, programs, or components, such as operating system software, database software, or application software. The DTMF test routine 232 can also comprise firmware or some other form of machine-readable processing instructions executable by the processing system 220.

Encoding the DTMF test routine 232 on the storage system 230 can transform the physical structure of the storage system 230. The specific transformation of the physical structure can depend on various factors in different implementations of this description. Examples of such factors can include, but are not limited to the technology used to implement the storage media of the storage system 230 and whether the computer-storage media are characterized as primary or secondary storage. For example, if the computer-storage media are implemented as semiconductor-based memory, the DTMF test routine 232 can transform the physical state of the semiconductor memory when the program is encoded therein. For example, the DTMF test routine 232 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

The method according to any of the embodiments may offer advantages. The method does not require the participation or adjustment of the second DTMF circuit. The method does not require the participation or adjustment on the part of the source of the one or more DTMF digits. The method enables essentially real-time adjustment of the DTMF circuit, wherein the DTMF circuit properly relays the one or more DTMF digits to the second DTMF circuit. The method enables adjustment of the DTMF circuit for the receipt and relay of a particular DTMF digit set, regardless of previous sampling window sizes and regardless of how previous DTMF digit sets were transferred by the DTMF circuit.

The mobile communication devices 506 and 507 can comprise any mobile communication devices and protocols, including cellular phones. The mobile communication devices 506 and 507 can perform communication services including voice calls, text messages, data access, or other communication services provided over packet communication networks, such as cellular or wireless packet communication networks. The mobile communication devices 506 and 507 can comprise subscriber equipment, customer equipment, an access terminal, a smartphone, a telephone, a mobile wireless telephone, a personal digital assistant (PDA), a computer, an e-book, a mobile Internet appliance, a wireless network interface card, a media player, a game console, or some other wireless communication apparatus, including combinations thereof.

The mobile communication devices 506 and 507 may include one or more transceiver portions for communication over one or more wireless links of differing frequency bands. The mobile communication devices 506 and 507 can move among any of the coverage areas associated with the mobile switching system 520 or the second mobile switching system 530 and receive wireless access. The mobile communication devices 506 and 507 can include one or more antennas, transceiver circuitry elements, and communication elements. The transceiver circuitry typically includes amplifiers, filters, modulators, and signal processing circuitry. The mobile communication devices 506 and 507 can also include user interface systems, memory devices, non-transitory computer-readable storage mediums, software, processing circuitry, or some other communication components.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A first Dual Tone Multi Frequency (DTMF) circuit for relaying DTMF digits, the first DTMF circuit comprising:
   a communication interface adapted to exchange one or more DTMF digits over a communication link;
   a storage system configured to store a sampling window size, a DTMF test sequence, a returned DTMF sequence, and the one or more DTMF digits, with the one or more DTMF digits to be transferred to a second DTMF circuit by the first DTMF circuit; and
   a processing system coupled to the communication interface and the storage system, with the processing system configured to receive the one or more DTMF digits via the communication interface and an input sampling window, generate the DTMF test sequence and transmit the DTMF test sequence as DTMF tones to the second DTMF circuit, compare the DTMF test sequence to a returned DTMF sequence received as DTMF tones within the input sampling window back from the second DTMF circuit, and if the returned DTMF sequence includes a different number of DTMF digits than the DTMF test sequence, then adjust the sampling window size of the input sampling window.

2. The first DTMF circuit of claim 1, wherein the sampling window size may be lengthened or shortened by the first DTMF circuit.

3. The first DTMF circuit of claim 1, wherein the DTMF test sequence comprises one or more pulses of a predetermined pulse width and/or a predetermined duty cycle.

4. The first DTMF circuit of claim 1, wherein the generating, comparing, and adjusting steps are iteratively performed until the returned DTMF sequence is the same as the DTMF test sequence.

5. The first DTMF circuit of claim 1, further comprising transferring the one or more DTMF digits to the second DTMF circuit after the sampling window size has been adjusted.

6. The first DTMF circuit of claim 1, wherein the processing system requests re-receipt the one or more DTMF digits after the sampling window size has been adjusted.

7. A method of relaying Dual Tone Multi Frequency (DTMF) digits in a first DTMF circuit, comprising:
   the first DTMF circuit receiving one or more DTMF digits via an input sampling window, with the one or more DTMF digits to be transferred to a second DTMF circuit by the first DTMF circuit;
   the first DTMF circuit generating a DTMF test sequence and transmitting the DTMF test sequence as DTMF tones to the second DTMF circuit;
   the first DTMF circuit comparing the DTMF test sequence to a returned DTMF sequence received as DTMF tones within the input sampling window back from the second DTMF circuit; and
   if the returned DTMF sequence includes a different number of DTMF digits than the DTMF test sequence, then the first DTMF circuit adjusting a sampling window size of the input sampling window.

8. The method of claim 7, wherein the sampling window size may be lengthened or shortened by the first DTMF circuit.

9. The method of claim 7, wherein the DTMF test sequence comprises one or more pulses of a predetermined pulse width and/or a predetermined duty cycle.

10. The method of claim 7, wherein the generating, comparing, and adjusting steps are iteratively performed until the returned DTMF sequence is the same as the DTMF test sequence.

11. The method of claim 7, further comprising transferring the one or more DTMF digits to the second DTMF circuit after the sampling window size has been adjusted.

12. The method of claim 7, wherein the first DTMF circuit requests re-receipt of the one or more DTMF digits after the sampling window size has been adjusted.

13. A method of relaying Dual Tone Multi Frequency (DTMF) digits in a first DTMF circuit, comprising:
   the first DTMF circuit receiving one or more DTMF digits via an input sampling window, with the one or more DTMF digits to be transferred to a second DTMF circuit by the first DTMF circuit;

the first DTMF circuit generating a DTMF test sequence and transmitting the DTMF test sequence as DTMF tones to the second DTMF circuit;

the first DTMF circuit determining if an elapsed time has exceeded a predetermined time threshold;

if the elapsed time has not exceeded the predetermined time threshold, then the first DTMF circuit comparing the DTMF test sequence to a returned DTMF sequence received as DTMF tones within the input sampling window back from the second DTMF circuit; and if the returned DTMF sequence includes a different number of DTMF digits than the DTMF test sequence, then the first DTMF circuit adjusting a sampling window size of the input sampling window and iteratively repeating the generating, determining, and comparing steps.

14. The method of claim 13, wherein the sampling window size may be lengthened or shortened by the first DTMF circuit.

15. The method of claim 13, wherein the DTMF test sequence comprises one or more pulses of a predetermined pulse width and/or a predetermined duty cycle.

16. The method of claim 13, further comprising transferring the one or more DTMF digits to the second DTMF circuit after the sampling window size has been adjusted.

17. The method of claim 13, wherein the first DTMF circuit requests re-receipt of the one or more DTMF digits after the sampling window size has been adjusted.

\* \* \* \* \*